United States Patent

[11] 3,590,485

[72] Inventors Raphael Chercheve
5, avenue de l'Opera, Paris;
Michel Chercheve, 5, avenue du General
Delestraint, Paris; Robert Bordon, 4, rue
Foch, Pau Basses-Pyrenees, all of, France
[21] Appl. No. 862,809
[22] Filed Oct. 1, 1969
[45] Patented July 6, 1971
[32] Priority Oct. 3, 1968
[33] France
[31] 168,664

[54] DENTAL IMPLANT
11 Claims, 1 Drawing Fig.
[52] U.S. Cl. ..................................................... 32/10
[51] Int. Cl. ..................................................... A61c 13/00
[50] Field of Search ......................................... 32/2, 10;
128/76, 92; 3/1

[56] References Cited
UNITED STATES PATENTS
2,347,567  4/1944  Kresse .......................... 32/10
OTHER REFERENCES
" Experiments Suggest Man Might Grow a New Heart"
WASHINGTON SUNDAY POST, Sept. 22, 1968.

Primary Examiner—Robert Peshock
Attorney—Holcombe, Wetherill & Brisebois

ABSTRACT: Dental implant comprising a central metallic rod encircled by a sleeve of solid animal tooth.

PATENTED JUL 6 1971 3,590,485
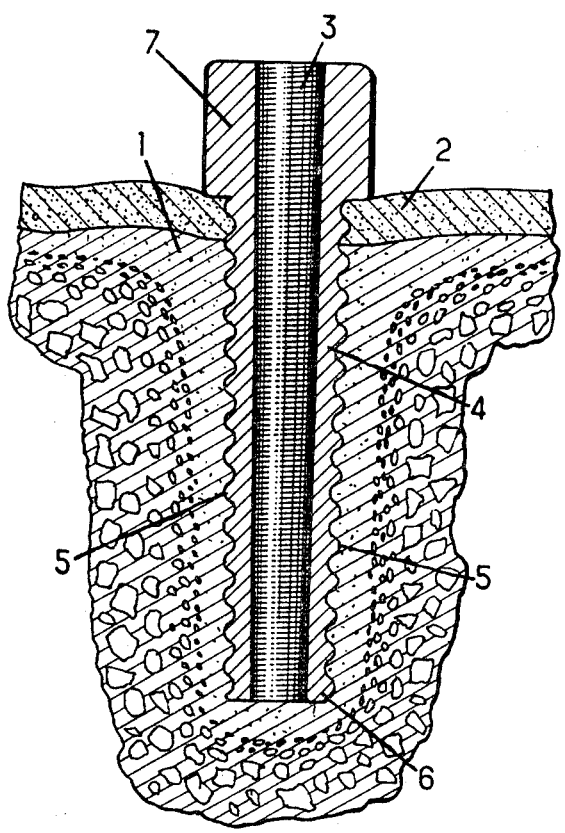
INVENTORS
RAPHAEL CHERCHEVE
MICHEL CHERCHEVE
ROBERT BORDON
BY Holcombe, Wetherill & Brisebois
ATTORNEYS

DENTAL IMPLANT

SUMMARY OF THE INVENTION

The metallic implants which are designed to be inserted in the tooth sockets of a jaw have well-known disadvantages in that the bone within which the implants are inserted tends to reject them as foreign bodies against which the human organism must be protected.

The present invention is intended to reduce the disadvantages heretofore inherent in the use of metallic implants. Its object is to provide a composite implant comprising in combination a metallic core completely covered by a dentine, that is to say, an ivory made from the teeth of animals such as horses, pigs, or the like, or even from human teeth.

The use of this material has several advantages and, especially in the case of animal teeth, that of being available in pieces large enough to make it possible to obtain the external dimensions required for such composite implants, and in particular for the larger outer parts thereof which are outside the mucous membrane. This outer part may be then shaped while in place in any desired manner so that a dental crown may be attached thereto.

The new composite implant preferably has a slightly conical shape at one end as well as a rounded peripheral thread which facilitates its introduction into the tooth socket. In particular, when the outer diameter of the composite implant is more than 3 mm., this thread makes it much easier for the implant to pass through the gingival mucous membrane.

However, this thread is not absolutely necessary, particularly when the portion of the implant which is to be seated in the tooth socket is in the shape of a thin blade, while its other end is in the form of a ball.

The dentine used to make the outer part of the composite implant is subjected to biological treatment in order to stabilize it before it is used.

This desensitizing treatment may consist of soaking it in liquid nitrogen, that is to say, of the application of cold, or preferably the application of gamma radiation.

Moreover, the above dentine which has first been subjected to this biological treatment may be obtained from animal teeth of any size, including those much smaller than horse teeth, by reducing this dentine to a powdered state, after which it is agglomerated by means of a suitable synthetic resin, which may preferably be an acrylic resin or an epoxy resin.

The core of the composite implant, that is to say the metallic rod, may preferably be made of stainless "18/8 steel containing 18 percent chromium and 8 percent nickel. This is covered by a conventional cement so that it may be attached to the inside of a human or animal tooth which has been previously provided with a threaded bore of the requisite diameter.

Titanium or any other metal or alloy which is chemically inert with respect to the particular cement may be used instead of the stainless steel so long as it is also inert with respect to the jawbone.

Tests carried out by applicants have shown that the jawbone does not react upon contact with the above dentine so as to produce rejection of the composite implant, and that the boney substance of the tooth socket tends simply to develop at the expense of this material, the nature of which is similar to that of the cement constituting the roots of human teeth.

At the end of several years, the peripheral part of the implant is accordingly completely replaced by the boney substance, but when this comes into contact with the central metallic portion of the composite implant, no abrupt rejection of the foreign body takes place, as is the case with entirely metallic implants of known types.

The central metallic portion is preferably slightly conical, with an outer diameter a little smaller than its inner diameter so that the crown may be attached to the top of the implant with maximum security.

The metallic core may also be provided with retaining grooves for receiving a sealing cement, but is preferably provided with sharp threads so that it may act as a tap and assure the progressive cutting of mating threads into the material constituting the annular peripheral portion of the composite implant as the core is screwed into said annular portion.

When an agglomerate based on the powder of animal teeth and comprising a resinous binder is used, the agglomerate may be simply molded on to the metallic core.

It should be noted that the composite implant according to the invention may be made in advance in shapes and dimensions corresponding to almost all the foreseeable needs, by first stabilizing the dentine constituting the external portion and then treating the implants in any appropriate way in the light of their intended commercial application.

The characteristics of the present invention will be better understood from a reading of the following description of one embodiment of the new composite implant according to the invention, which embodiment is being described purely by way of example and with reference to the accompanying drawing, in which the single FIGURE represents an axial section through a composite implant showing it in place in the tooth socket of a human jaw.

The jawbone is shown at 1 beneath the gingival membrane 2.

The composite implant comprises a central metallic core 3 which is threaded to permit it to be screwed into an annular portion 4 which may be made by molding it from an agglomerate of dentine and a suitable resinous binder, or by machining an animal tooth of sufficient size, such as a pig or horse tooth, for example.

The annular part 4 is provided with a rounded peripheral thread 5 which facilitates the insertion of the composite implant into the tooth socket.

The threaded metallic core 3 is slightly conical in the example illustrated in the drawing, but may be cylindrical, provided that after allowing for the conicity of the inner end 6 of the annular part 4, this outer part is thick enough not to crack under the pressure which results from chewing food. The annular part 4 comprises an outer end 7 having a larger cross section and adapted to receive a metallic covering.

This outer part may have almost any cross-sectional shape, whether cylindrical, oval, or square, or be spherical or ellipsoidal, depending on the type of tooth in question.

In particular, when an agglomerate is used which is molded onto the metallic core, it is easy to give the outer part the most advantageous shape so as to reduce to a minimum the machining which must be done in situ.

When the annular member is molded on the metallic core the threads of the core may, as has been hereinbefore pointed out, be replaced by retaining notches, which may be more or less close together.

The length of the outer part 7 of the composite implant is of the order of 4 mm., whereas the length of the inner part of the implant which is designed to cooperate with the tooth socket and adapted to be seated therein is between 20 and 40 mm.

The outer diameter of the outer end 7 is between 4 and 6 mm. whereas that of the inner end 6 is between 2 and 4 mm.

The diameter of the outer end of the metallic core is between 1.5 and 2.5 mm., and the diameter of its inner end is always greater than 1 mm.

It will, of course, be appreciated that the embodiment which has just been described may be modified as to detail without thereby departing from the basic principles of the invention as defined by the following claims.

We claim:

1. Dental implant comprising a central metallic core encircled by an annular member cut from a solid animal tooth.

2. Implant as claimed in claim 1 in which said animal tooth is a human tooth.

3. Implant as claimed in claim 1 in which the outer end of the annular member is larger in diameter than its inner end.

4. Implant as claimed in claim 1 in which said annular member is provided with a peripheral thread.

5. Implant as claimed in claim 1 having a portion adapted to be seated in a tooth socket, which portion is from 20 to 40 mm. long.

6. Implant as claimed in claim 1 having a portion of said implant designed to project from a tooth socket, which portion is about 4 mm. high.

7. Implant as claimed in claim 1 having an outer diameter of between 4 and 6 mm.

8. Implant as claimed in claim 1 in which the diameter of said core is between 2 and 4 mm.

9. Implant as claimed in claim 1 in which the diameter of the inner end of the metallic core is between 1.5 and 2.5 mm.

10. Implant as claimed in claim 1 in which said metallic core is slightly conical and its outer end has a diameter slightly greater than its inner end.

11. Implant as claimed in claim 1 in which said metallic core is provided with an external thread by means of which it may be screwed into said annular member.